(12) United States Patent
Bird-Radolovic et al.

(10) Patent No.: US 8,099,193 B2
(45) Date of Patent: Jan. 17, 2012

(54) CONTROL SYSTEM FOR AN INDUSTRIAL ROBOT

(75) Inventors: Ian Bird-Radolovic, Västerås (SE); Peter Eriksson, Västerås (SE)

(73) Assignee: ABB AB, Västerås (SE)

( * ) Notice: Subject to any disclaimer, the term of this patent is extended or adjusted under 35 U.S.C. 154(b) by 668 days.

(21) Appl. No.: 12/301,203

(22) PCT Filed: Mar. 27, 2007

(86) PCT No.: PCT/EP2007/052925
§ 371 (c)(1),
(2), (4) Date: Nov. 17, 2008

(87) PCT Pub. No.: WO2007/131828
PCT Pub. Date: Nov. 22, 2007

(65) Prior Publication Data
US 2009/0187277 A1    Jul. 23, 2009

(30) Foreign Application Priority Data
May 16, 2006   (EP) ..................... 06114036

(51) Int. Cl.
*H02K 7/10* (2006.01)
*H02K 17/32* (2006.01)
*H02P 3/04* (2006.01)
*G05B 15/00* (2006.01)
(52) U.S. Cl. ...................... 700/260; 318/371
(58) Field of Classification Search .................. 700/245; 318/371
See application file for complete search history.

(56) References Cited

U.S. PATENT DOCUMENTS 5,327,055 A * 7/1994 Danielson et al. ............ 318/366
5,783,922 A * 7/1998 Hashimoto et al. ...... 318/568.14
(Continued)

FOREIGN PATENT DOCUMENTS
EP     0927612 A1   7/1999

OTHER PUBLICATIONS
PCT/ISA/210—International Search Report—May 15, 2007.

*Primary Examiner* — James Trammell
*Assistant Examiner* — Michael D Lang
(74) *Attorney, Agent, or Firm* — Venable LLP; Eric J. Franklin

(57) ABSTRACT

A control system for controlling an industrial robot and a method thereof. A control unit generates a control signal for controlling the motor. At least one drive unit controls the motor. The drive unit includes a switching unit adapted to convert DC current to alternating current to the motor in dependence on the control signal. A safety unit generates a stop signal for stopping the robot upon occurrence of a safety event. The drive unit disables the switching unit upon receiving the stop signal. The safety unit generates the stop signal with a time delay with respect to the safety event. The control unit generates the control signal in such a way that the motor is electrically braked during the time delay. The control system transfers the stop signal to the brake, which mechanically brakes the motor upon receiving the stop signal, and delays the stop signal to the drive unit so that the brake receives the stop signal before the drive unit to ensure that the mechanical brake is applied before the switching unit is disabled.

8 Claims, 2 Drawing Sheets

U.S. PATENT DOCUMENTS

| | | |
|---|---|---|
| 6,477,441 B1 | 11/2002 | Sagasaki |
| 6,573,681 B2 | 6/2003 | Schwesig |
| 6,992,458 B2 * | 1/2006 | Hashimoto et al. ...... 318/568.13 |
| 7,525,273 B2 * | 4/2009 | Hashimoto et al. ........... 318/519 |
| 2001/0037162 A1 * | 11/2001 | Matsumoto .................. 700/245 |
| 2003/0050735 A1 * | 3/2003 | Griffis .......................... 700/255 |
| 2003/0141155 A1 * | 7/2003 | Daneryd et al. ........... 188/267.1 |
| 2004/0260481 A1 * | 12/2004 | Heiligensetzer et al. ....... 702/33 |

\* cited by examiner

CONTROL SYSTEM FOR AN INDUSTRIAL ROBOT

CROSS-REFERENCE TO RELATED APPLICATIONS

This application claims priority to European patent application 06114036.4 filed 16 May 2006 and is the national phase under 35 U.S.C. §371 of PCT/EP2007/052925 filed 27 Mar. 2007.

FIELD OF THE INVENTION AND PRIOR ART

The present invention relates to a control system and a method for controlling an industrial robot having at least one motor.

An industrial robot includes a mechanical structure, also denoted a manipulator, and a control system for controlling the movements of the manipulator. The manipulator has a plurality of arms that are movable relative each other about a plurality of axes. The movements of the axes are driven by motors mounted on each axis. Each motor is provided with a mechanical brake to lock the robot position when it is not moving. Typically, a robot consists of six axes. However, robots with other numbers of axes also exist.

The speeds and accelerations of the axes are controlled by the control system of the robot, which comprises a control unit generating control signals to the motors. The control signals to the drive units determine motor torque, motor speed, and drive currents for the axis. The control system also comprises drive units, which control the motors by converting DC current to a variable alternating current in dependence on control signals from the control unit. The drive units are supplied with AC power. Each drive unit includes a rectifier converting the supplied AC power into DC power, and a switching unit, often denoted an inverter, converting the DC power to AC power in response to the control signal from the control unit. The motors are equipped with angle-measuring devices to provide position feedback signals. The feedback signals from the angle-measuring devices are transferred to the drive unit.

The control system of the robot also includes safety functions to ensure that the manipulator is operated in a safe way with regard to the operator. The safety functions, for example, include emergency stop function and robot speed supervision. The control system includes a safety unit adapted to generate at least one stop signal for stopping the robot upon occurrence of a safety event and the brakes are adapted to mechanically brake the motors upon receiving the stop signal from the safety unit.

A key feature of an industrial robot is the ability to disable the possibility to move the mechanical structure, in a safe way, when certain critical safety events occur. This might include an operator pushing an emergency stop button or releasing an enabling device during teaching. Conventionally, the robot is disabled by opening one or more electromechanical contactors, which supply AC power to the rectifiers of the drive units, and opening one or more contactors, which feed power to the brakes. If there is no incoming power, the drive unit cannot power the motors and so the robot cannot be moved. For example, the power is removed by having two contactors in series, which can both disconnect the AC power. This gives a level of redundancy, so that if one contactor fails the other will probably is still be working. A disadvantage with this approach is that the electromechanical contactors are bulky, expensive, and have a limited lifetime compared with other electronic systems.

U.S. Pat. No. 6,573,681B2 proposes to stop a motor upon receiving a stop signal by disable an inverter adapted to convert DC current to alternating current to the motor, and more particularly by turning off power transistors of an inverter. A problem with stopping the motor by means of disabling the converter is that the moment the inverter is disabled, it becomes impossible to control the motor. The movements of the motor do not immediately stop when the inverter is disabled, and during the slow down time the motor can not be controlled. This can be dangerous if the motor controls the movements of a robot. If it is not possible to control the motor, the mechanical structure of the robot will drop due to gravity on the structure. As a solution to this problem, it is proposed to accelerate the breaking operation by means of armature short-circuit in order to achieve a safe stopping. However, this is not enough to achieve a safe stopping of an industrial robot.

OBJECTS AND SUMMARY OF THE INVENTION

One object of the present invention is to achieve a safe stopping of an industrial robot upon occurrence of a safety event.

According to one aspect of the invention, this object is achieved by a control system.

Such a control system is characterized in that the drive unit is adapted to disable the switching unit upon receiving a stop signal from a safety unit thereby preventing generation of AC power to the motor, the safety unit is adapted to generate a stop signal with a time delay with respect to the safety event and the control unit is adapted to generate the control signal for controlling the motor in such a way that the motor is electrically braked during the time delay, the control system is adapted to transfer the stop signal to the brake, which mechanically brakes the motor upon receiving the stop signal, and the control system is adapted to delay the stop signal to the drive unit so that the brake receives the stop signal before the drive unit to ensure that that the mechanical brake is applied before the switching unit is disabled.

The possibility to move the mechanical structure of the robot is disabled by disabling the switching unit that generates the alternating current to the motor. This allows the contactors, used in the prior art, to be removed from the control system. Thereby, the hardware cost for the control system is reduced, the reliability of the control system is increased, and the size of the control system is reduced.

According to the invention, the stopping of the motor is made by a sequence of operations, the timing of which is crucial for achieving a safe stopping. When a safety event occurs, the control unit generates a control signal that electrically brakes the motor, the mechanical brakes are applied after a time delay, and the switching unit is disabled after a further time delay, in order to allow the brakes to be fully engaged.

The mechanical brake is applied before the switching unit is disabled. Thereby, it is ensured that the mechanical structure of the robot will not drop due to gravity when the switching unit is disabled. Further, the stop signal to the brake is generated with a time delay with respect to the safety event, and the control signal to the drive unit is generated in such a way that the motor is electrically braked during the time delay. This makes it possible to reduce the speed of the motor before applying the mechanical brake, and thereby minimizing the stress on the mechanical structure and making is possible to keep the mechanical structure on the preprogrammed path.

Thus, the robot is stopped in a safe way by a combination of electrical braking, applying the mechanical brake, and disabling the switching unit, each applied at different points in time after the safety event has been detected.

According to an embodiment of the invention, the drive unit is adapted to disable the control signal to the switching unit upon receiving the stop signal. The control signal from the control unit controls the switching of the switching unit. If the control signal to the switching unit is disabled, the switching unit cannot be turned on or off, and accordingly it becomes impossible for the switching unit to switch. If the switching unit cannot switch, it cannot be used to generate a pulse train and so there is no way to control the motor or generate a torque. This effectively brakes the AC power supply to the motor.

According to an embodiment of the invention the drive unit comprises an opto switch adapted to transfer the control signal to the switching unit, and the drive unit is adapted to turn off the opto switch upon receiving the stop signal, thereby disabling the control signal to the switching unit. An opto switch is a widely used standard component, and is suitable to use for disabling the control signal to the switching unit.

According to an embodiment of the invention, the control system comprises a controlled rectifier providing the drive unit with DC power, and the safety unit is adapted to generate a second stop signal upon occurrence of a safety event, and the rectifier is adapted to be turned off upon receiving the second stop signal. Thereby, the ability of the rectifier to transfer power from the AC side to the DC side of the control system is stopped. This embodiment provides two separate, and thus redundant, ways remove the power to the motors of the robot. The first way turns off the rectifier, which provides the switching unit with DC power, and the second way turns off the switching unit, which converts DC power to AC power to the motors. Preferably, the rectifier should be turned off before the brake is applied and before the switching unit is turned off. This embodiment further increases the safety of the control system.

According to an embodiment of the invention, the control unit, the drive unit, and the safety unit are integrated into one physical unit. By integrated is understood that the control unit, the drive unit, and the safety unit are integrated on the same board, and share essential hardware, such as power supply and communication electronics. This embodiment reduces size and hardware cost for the control system.

According to another aspect of the invention, the object is achieved with a method.

It is easy to realize that the method according to the invention is suitable for execution by a computer program having instructions corresponding to the steps in the inventive method when run on a processor unit.

According to a further aspect of the invention, the object is achieved by a computer program product. The computer program is provided either on a computer-readable medium or through a network.

According to another aspect of the invention, the object is achieved by a computer readable medium.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
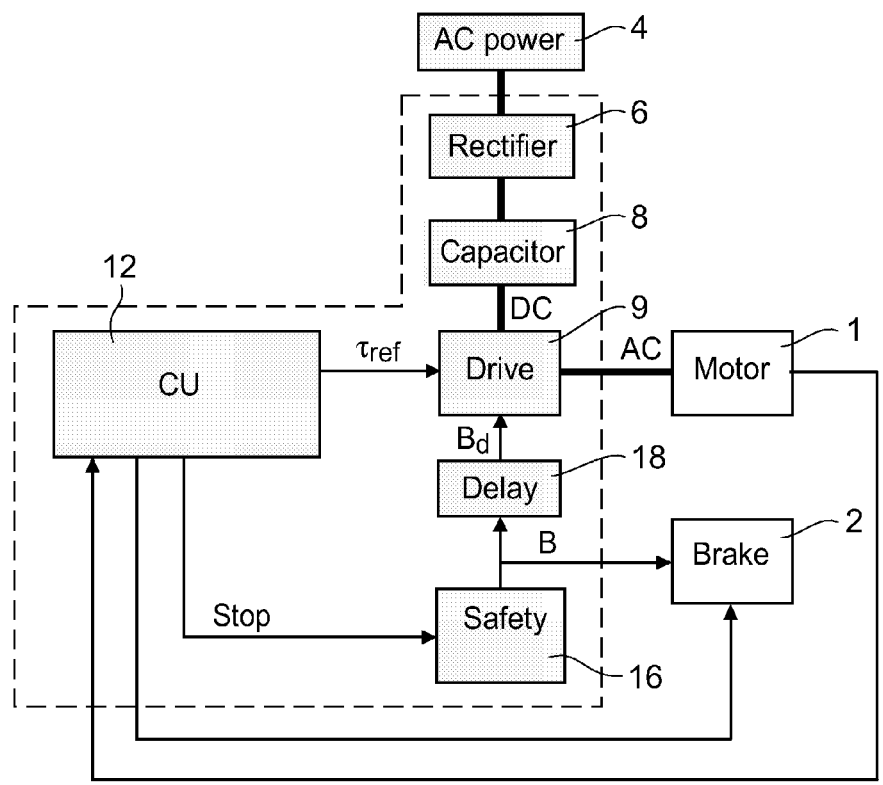
FIG. 1 shows a block diagram of a robot control system according to a first embodiment of the invention including a drive unit.

FIG. 1 shows a control system for an industrial robot according to a first embodiment of the invention. An industrial robot comprises a plurality of motors 1 controlling the position and speed of the robot. Each motor 1 is provided with a mechanical brake 2. The brake 1 is controlled by an electromagnet such that when the power to brake is on, the brakes will be open and when the brake power is removed, the brakes engage. According to an embodiment of the invention, the power supply to the brake 1 is controlled by a power electronic switch (not shown in the figure).

The drive system to the motor 1 includes an AC power source 4, a rectifier 6, which converts AC power from the power source into DC power, a capacitor 8, which is able to store DC power for a short time period, and a drive unit 9, which converts the DC power to an alternating current in response to a control signal $\tau_{ref}$. The control signal $\tau_{ref}$ is generated based on a control program including movement instructions for the robot.

The control system comprises a control unit 12 including one or more computers. The control unit 12 is adapted to run the control program and to generate a movement path based on the movement instructions in the control program. The control unit generates reference values comprising desired values for position, speed and acceleration of the motors, which are trans-formed into control signals $\tau_{ref}$ for the drive unit 9. The drive unit 9 is responsible for controlling the motor current and the motor position in response to the control signal $\tau_{ref}$ from the control unit 12. The control unit receives a feedback signal from the motor including position information. The control unit provides conditional brake commands to the brake 2, for example during test of the brake, and when the robot is ordered to stand still.

The control system further comprises a safety unit 16, which ensures that the robot is operated in a safe way with regard to the operator, and is the input for safety signals, such as emergency stop and teach mode key selector. The safety unit 16 receives unconditional stop orders from control unit. A task for the safety units 16 is to carry out stop orders received from the control unit 12. Upon receiving a stop order from the control unit 12, the safety unit 16 generates a stop signal B, for stopping the movement of the robot and applying the mechanical brakes 2. The stop signal B is delayed in a delay unit 18 before it is transferred to the drive unit 9. The delayed stop signal B is denoted $B_d$. Alternatively, the delay of the stop signal B can be carried out in the safety unit 16 or in the drive unit 9. The delayed stop signal $B_d$ from the safety unit, prevents the drive unit 9 from generating alternating current to the motor 1. The stop signal B is connected to the power electronic switch of the brake 1, thereby controlling the brake power.

Figure 2:
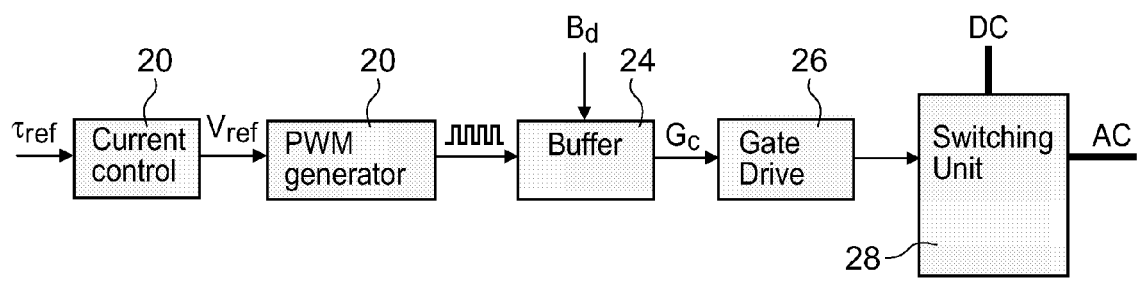
FIG. 2 shows a block diagram of the drive unit shown in FIG. 1.

FIG. 2 shows the drive unit 9 in more detail. The reference signal $\tau_{ref}$ from the control unit 12 is received by a current control unit 20, which creates a voltage reference $V_{ref}$ which is fed into a Pulse Width Modulation (PWM) generator. The signal from the PWM generator 22 is a pulse train, which is fed to a buffer 24, in this case an optocoupler. The buffer 24 is provided with an enabling circuit, which makes it possible to turn on and off the buffer 24 in dependence on a control signal connected to the enabling circuit. In this embodiment of the invention, the delayed stop signal $B_d$ is connected to the enabling circuit of the buffer 24. When the buffer is turned on, the pulse train from the PWM generator is transferred to a gate drive 26, and then further to a switching unit 28. When the buffer 24 is turned off, the pulse train from the PWM generator 22 is prevented from being transferred to the switching unit 28. Accordingly, the function of the buffer 24 is to turn on and off the switching unit in response to the signal $B_d$. Thus, the signal $G_c$ from the buffer is a control signal that controls the switching of the switching unit 28. The signal $G_c$ from the buffer is disabled by the delayed stop signal $B_d$ from the safety unit.

The switching unit 28, also denoted an inverter, converts DC power from the capacitor 8 into AC power, which is fed to the motor. Traditionally, the switching unit is made up of six switching devices, such as IGBTs, which are switched on and off in response to the pulse train from the PWM generator. The switching pattern, i.e. Pulse Width Modulation (PWM) is chosen in such a way that the output voltage resembles a sinusoid, which is used to control the motor. The switching unit includes a circuit for turning on and off the switching unit in response to the control signal. If the pulse train from the PWM generator is disabled, so that it cannot propagate through the drive unit 9 to turn on the switching unit 28, it will be impossible for the switching unit 28 to switch, and thereby to generate alternating current to the motor. If the switching unit cannot switch, there is no way to control the motor, or to generate a torque. This effectively breaks the power to the motor and thereby disables the possibility to move the mechanical structure of the robot.

The mechanical structure of the robot includes a number of mechanical joints controlled by the motors. Even when the motor is at rest there is considerable force due to gravity trying to act on the joints. So long as the brakes are disengaged, this force has to be counteracted by the motors. This can only be done if the switching unit is active and that there is DC power available to a switching unit. This is particularly a problem for a stationary robot that is fully outstretched, since this represents a case where the gravity torque will be at its highest.

A disadvantage with disabling the switching unit is that the moment the switching unit is disabled, it becomes impossible to control the motor. This means that the only way to stop the motor is via the mechanical brakes. However, it is desirable that the motor speed is low before applying the mechanical brakes, otherwise more powerful brakes are required in order to stop the robot, and the mechanical stress on the robot structure becomes high. Therefore, it is a desire to reduce the speed of the motor before applying the mechanical brakes. Due to the fact that the DC power supply to the switching unit is still intact, there is an energy source to keep the motor control alive. All that is required is that the brakes are applied before the switching unit is turned off. According to this embodiment of the invention, this is achieved by the safety signal B, which first activates the brakes 2 and then after a delay 18 disables the switching unit 28. The delay 18 must be chosen so that the brake is fully engaged before the switching unit 28 is disabled. The delay time needed is dependent on the motor performance, the brake performance and the mechanical structure. The delay time can be a fixed delay time, or a variable delay time that depends on the speed of the robot. If the robot is moving with a low speed the required delay time is shorter than if the robot is moving with a high speed.

Before the brakes are applied and the switching unit is disabled the speed of the motor has to be reduced. This is done by electrically braking the motor before generating the stop signal B to the brake and $B_D$ to the drive unit 9. When a safety event occurs, the control unit is instructed to generate a reference signal $\tau_{ref}$ that electrically brakes the motor, the mechanical brakes are applied after a time delay, and the switching unit is disabled after a further time delay, in order to allow the brakes to be fully engaged. Thus, the robot is stopped by a combination of electrical braking and mechanical braking. The reason for having the electrical braking is that the brakes should not come on when the robot is still running at full speed, as this would wear out the brakes and overstress the mechanics. Therefore, it is better to allow the drives to do as much braking as possible. From the point of view of safety, the brakes should come on as quickly as possible so there is no risk of the controller losing electrical torque before the brakes are engaged. However, from the point of view of the mechanics, it is better for the brakes to come on later so that the stress on the mechanics can be minimized. Electrical braking only works if the switching unit is activated and there is sufficient power available to overcome the force of gravity action on the robot structure.

An advantage with the removal of the contactors from the safety unit is that it is possible to integrate the axis control, the safety control and the drive control into a single unit, or a subsystem made up of a small number of units. In the embodiment disclosed in FIG. 1, the control unit 12, the drive unit 9, and the safety unit 16 are integrated into one single unit, as shown by a dashed line.

Figure 3:
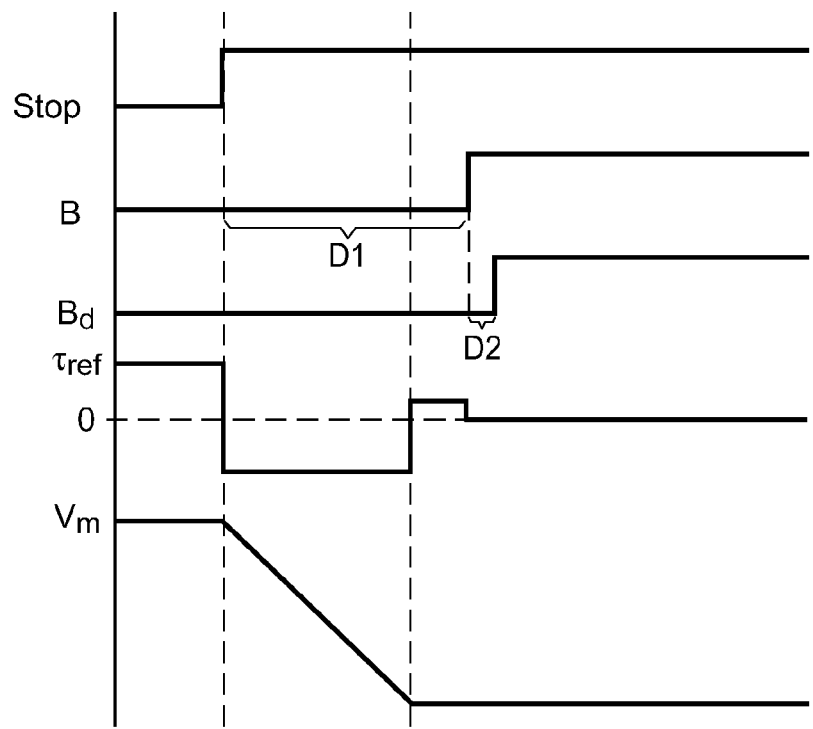
FIG. 3 shows time diagrams illustrating the relation between generated signals upon occurrence of a safety event.

FIG. 3 shows a time diagram illustrating the relation between the different signals described with reference to FIGS. 1 and 2. Upon detecting a safety event, the control unit generates a stop order that is transferred to the safety unit 16. Upon receiving the stop order, the safety unit 16 generates a stop signal B, which is delayed a time interval D1 in relation to the received stop order from the control unit. The stop signal B is connected to the power electronic switch of the brake and turns off the power to the brake when it goes high. The time delay D1 is the time needed for the motors to be electrically braked to sufficiently low speed for applying the brakes. A reference signal $\tau_{ref}$ regarding the motor torque, from the control unit 12 controls the speed of the motor. At the same time as the stop order is generated, the reference signal $\tau_{ref}$ becomes negative, thereby beginning to reduce the speed of the motor. During the time delay D1, until the speed of the robot becomes zero, a negative reference signal $\tau_{ref}$ is generated which reduces the speed of the motor. When the speed of the robot has become zero and until the mechanical brake has been applied, the reference signal $\tau_{ref}$ is positive, in order to counteract the gravity on the mechanical structure. When the brake has been applied, the reference signal $\tau_{ref}$ becomes zero.

FIG. 3 also shows the speed $v_m$ of the motor. As seen from the figure, the motor speed is reduced during the time delay D1. When the speed of the motor is almost zero the brake is applied. The stop signal B is delayed a time interval D2, and before it is transferred to the switch enabling circuit of the switching unit. The disabling signal to the switching unit, i.e. the delayed stop signal B, is denoted $B_D$. Thus, the switching unit is disabled after the brakes are applied.

To increase the safety, the disabling of the buffer should be done in a redundant way. This could be achieved in many different ways. For example, the safety unit may generate two stop signals B, and the drive unit 9 may include two opto couplers connected in series.

Figure 4:
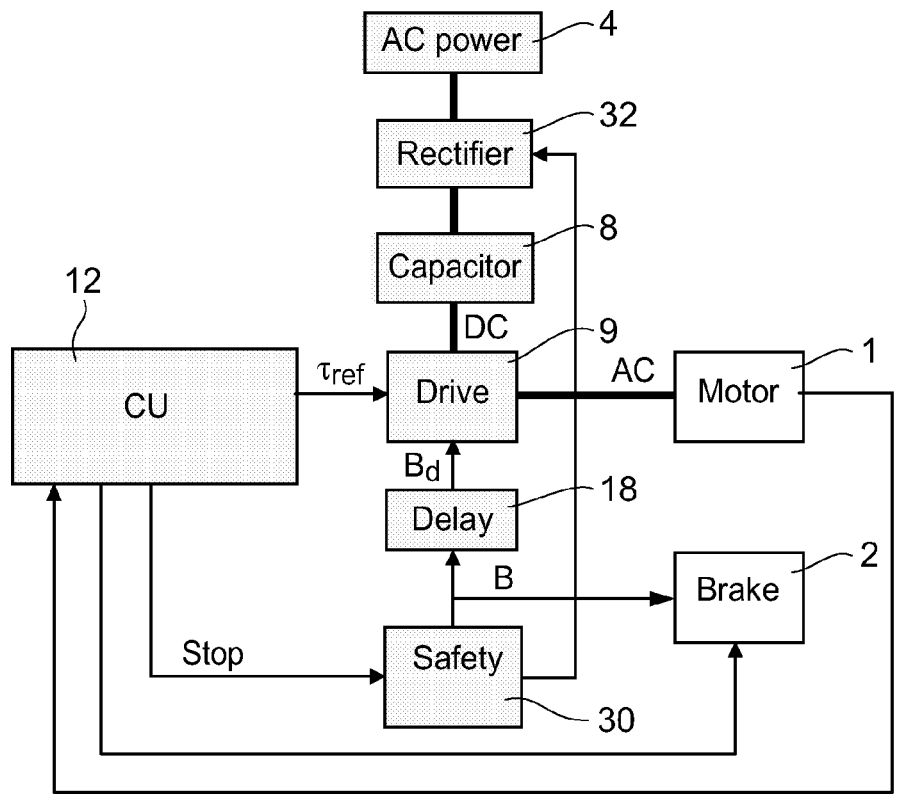
FIG. 4 shows a block diagram of a robot control system according to a second embodiment of the invention.

FIG. 4 shows a second embodiment of a control system according to the invention, which has a redundant disabling of the motor upon occurrence of a safety event. A standard diode rectifier will always allow power to flow from the AC side to the DC side. However, in this embodiment the standard diode rectifier has been replaced with a device which can be electronically turned on and off in response to a control signal. Then, it becomes possible to disconnect the power flow to the motor 1. A safety unit 30 generates a second stop signal R upon receiving a stop order from the control unit. The safety unit 16 is connected to the rectifier 32. The signal R is a rectifier disable signal and is transferred from the safety unit to the rectifier.

The rectifier disable signal R is used as a second redundant safety signal in addition to the first stop signal B. An advantage with this concept is that, as long as the capacitor 8 has some stored power, it is possible to control the motor. When a stop event is required, the rectifier can be disabled and the motor can be ordered to decelerate to a standstill using the conventional speed controller. During deceleration, some of the kinetic energy in the motor is transferred to electric energy in the capacitor. This means that the switching unit can be used to slow down the motor before the mechanical brake is applied and the switching unit is disabled. This is important as the mechanical brake come on hard and fast and provides a considerable shock to the robot mechanics. It is therefore preferred that the motors should be moving at a low speed when the mechanical brakes are applied.

It is also possible to achieve the disabling of the movement of the mechanical structure solely by disabling the rectifier, without disabling the switching unit. Then, the redundancy can be achieved by having two disable rectifier signals. In another embodiment, the motor speed is reduced to zero before applying the mechanical brake. This can be done by tuning the delay time in the sequence.

The invention claimed is:

1. A control system for controlling an industrial robot having at least one motor and a brake adapted to brake the motor, the control system comprising:
   at least one control unit generating a control signal for controlling the motor,
   at least one drive unit for controlling the motor, the drive unit having a switching unit adapted to convert DC current to alternating current to the motor in dependence on said control signal, and
   a safety unit adapted to generate at least one stop signal for stopping the robot upon occurrence of a safety event,
   wherein said drive unit is adapted to disable said switching unit upon receiving said stop signal thereby preventing generation of AC power to the motor,
   wherein the safety unit is adapted to generate said stop signal with a time delay with respect to the safety event and said control unit is adapted to generate said control signal in such a way that the motor is electrically braked during said time delay,
   wherein the control system is adapted to transfer said stop signal to said brake, which mechanically brakes the motor upon receiving the stop signal, and
   wherein the control system is adapted to delay the stop signal to the drive unit so that the brake receives the stop signal before the drive unit to ensure that that the mechanical brake is applied before the switching unit is disabled.

2. The control system according to claim 1, wherein said drive unit is adapted to disable the control signal to the switching unit upon receiving said stop signal, thereby preventing the switching unit from switching.

3. The control system according to claim 1, wherein said drive unit comprises an opto switch adapted to transfer said control signal to the switching unit, and wherein the drive unit is adapted to turn off the opto switch upon receiving said stop signal thereby disabling the control signal to the switching unit.

4. The control system according to claim 1, further comprising:
   a controlled rectifier providing the drive unit with DC power, wherein said safety unit is adapted to generate a second stop signal upon occurrence of a safety event, and wherein said rectifier is adapted to be turned off upon receiving said second stop signal.

5. The control system according to claim 1, wherein the control unit, the drive unit, and the safety unit are integrated into one physical unit.

6. A method for controlling an industrial robot having at least one motor, a brake adapted to mechanically brake the motor, and a control system comprising a control unit generating a control signal for controlling the motor, at least one drive unit having a switching unit adapted to convert DC current to alternating current to the motor in dependence on said control signal, the method comprising:
   generating a signal for applying the mechanical brake upon occurrence of a safety event, wherein the signal for applying the brakes is generated with a time delay with respect to the safety event,
   generating said control signal in such way that the motor is electrically braked during said time delay, and
   generating a signal for disabling said switching unit upon occurrence of a safety event, thereby preventing generation of AC power to the motor, wherein the signal for disabling said switching unit is generated with a time delay with respect to the signal for applying the mechanical brake so that the brake receives the signal for applying the brake before the switching unit receives the signal for disabling the switching unit to ensure that the motor is mechanically braked before the switching unit is disabled.

7. The method according to claim 6, wherein said switching unit is disabled by disabling the control signal to the switching unit, thereby preventing the switching unit from switching.

8. A computer program product, comprising:
   a computer readable medium; and
   computer program instructions recorded on the computer readable medium and executable by a computer of a control system of an industrial robot having at least one motor, a brake adapted to brake the motor, and at least one drive unit generating AC power to the motor having a switching unit adapted to convert DC power to AC power in response to a control signal the computer program instructions for performing a method comprising:
   generating a signal for applying the brake upon occurrence of a safety event, wherein the signal for applying the brakes is generated with a time delay with respect to the safety event,
   generating said control signal in such way that the motor is electrically braked during said time delay, and
   generating a signal for disabling said switching unit upon occurrence of a safety event, thereby preventing generation of AC power to the motor, wherein the signal for disabling said switching unit is generated with a time delay with respect to the signal for applying the mechanical brake so that the brake receives the signal for applying the brake before the switching unit receives the signal for disabling the switching unit to ensure that the motor is mechanically braked before the switching unit is disabled.

* * * * *